United States Patent [19]
Horibe et al.

[11] Patent Number: 5,479,391
[45] Date of Patent: Dec. 26, 1995

[54] DISK APPARATUS

[75] Inventors: Ryusuke Horibe, Kobe; Masahiro Honjo, Sakai, both of Japan

[73] Assignee: Matsushita Electric Industrial Co., Ltd., Osaka, Japan

[21] Appl. No.: 111,565

[22] Filed: Aug. 25, 1993

[30] Foreign Application Priority Data

Aug. 26, 1992 [JP] Japan ..................................... 4-226872

[51] Int. Cl.$^6$ ............................. G11B 27/00; G11B 5/02
[52] U.S. Cl. ................................................ 369/60; 360/23
[58] Field of Search ................................. 369/49, 48, 60; 360/22, 23, 13, 14.1

[56] References Cited

U.S. PATENT DOCUMENTS 5,130,816  7/1992  Yoshio ........................................ 369/49

Primary Examiner—Georgia Y. Epps
Assistant Examiner—P. W. Huber
Attorney, Agent, or Firm—Wenderoth, Lind & Ponack

[57] ABSTRACT

A disk apparatus composed of a disk recording system includes a disk recording medium divided into a plurality of regions in a track direction; a data compressor for compressing the data in terms of time, a recording data delaying apparatus for rearranging the compressed data in time series, a data compounding apparatus for compounding the respective channels into one data a data recording apparatus for recording on the disk recording medium the compounded data; and a data reproducing system including a data reproducing apparatus for reproducing compressed data recorded on the disk recording medium; a data separating apparatus for separating for each channel the reproduced data; a reproducing data delaying apparatus for adjusting the timing of the data of each channel; a data expander for expanding the compressed data of a plurality of channels; an apparatus for compressing in terms of time the data of each channel of signals of a plurality of channels; and separating, recording in a track direction the data of each channel on the disk recording medium; and an apparatus for simultaneously and continuously reproducing the data of a plurality of channels which have been separated, and recorded in a track direction on the disk recording medium.

9 Claims, 12 Drawing Sheets

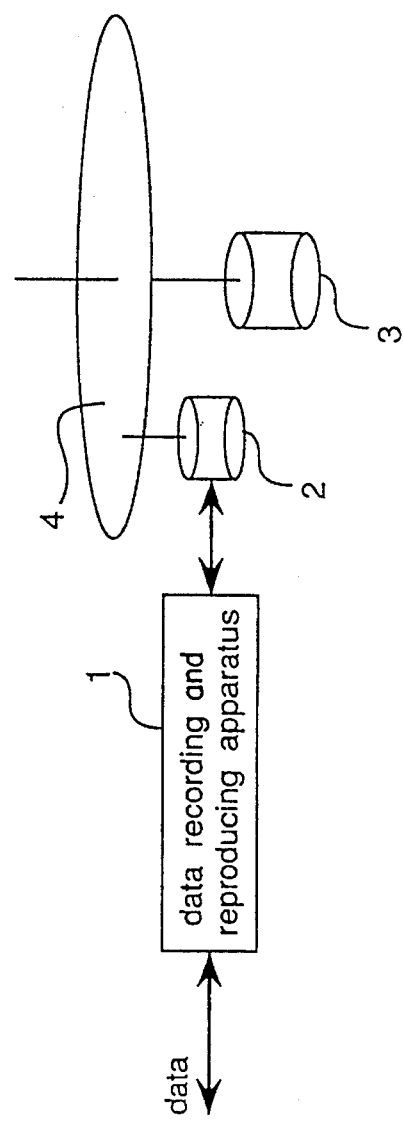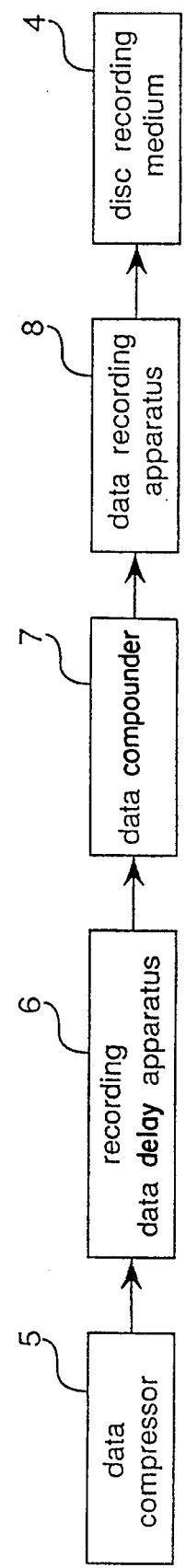

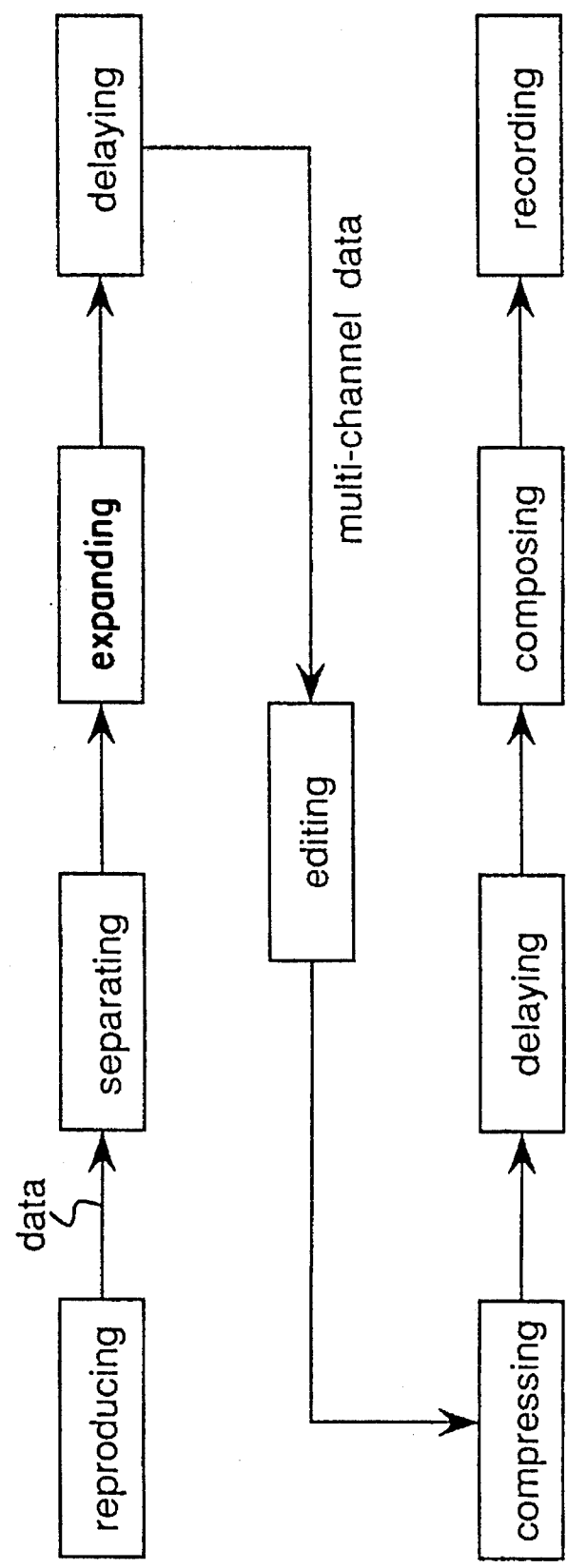
Fig. 14  Flow of data processing

DISK APPARATUS

BACKGROUND OF THE INVENTION

The present invention generally relates to a disk apparatus for compressing, in terms of time, the data of the respective channels of signals having a plurality of channels of image signals, by voice signals and so on, and separating, recording each of them on a disk recording medium.

In recent years, the chances of editing images or sounds are considerably increased in number because of developments in information communication fields. Especially demands for editing has increased in broadcasting stations. Operationality is considered to be important in the editing operation. Especially the contraction of the editing operating time is most important. In the editing operation, a series of operations such as a plurality of file retrieval operations, reproducing operations, optional processing operations, recording operations on information recording media again are effected. There are magnetic tape, magnetic disks, optical disks and so on as information recording media to be used in the editing operation.

A plurality of tracks can be recorded, and reproduced at the same time in the recording, and reproducing apparatus using magnetic tape, because a plurality of parallel tracks can be provided on the magnetic tape. But the file retrieving operation has a defect in that the retrieving speed is slow, because only the retrieving operation in a primary direction such as fast forward or playback can be effected with respect to the tape. The magnetic tape or the magnetic head wears out due to friction, because the magnetic tape is in direct contact against the magnetic head which is adapted to record, and reproduce the information on it.

As the pick up operation for reading out the information can be freely moved on the recording face in the magnetic disk or the optical disk, the file retrieving operation can be effected at higher speeds in a secondary dimension.

Although a magnetic disk or an optical disk is capable of being used in a high speed retrieving operation, it is basically impossible to handle a plurality of tracks, or to record or reproduce many channels at the case of same time as in the magnetic tape, because the magnetic disk and the optical disk basically have only one pick up. The information recording operation of a plurality of channels can be effected if the information is compressed in terms of time and the information of each channel is recorded by time division. It is actually effected on a CD or the like.

It is difficult to extract with high speed the information of a specific channel only, because the information recorded in this manner is minutely arranged in a primary dimension with the respective channels being provided by time division. It is difficult to record the other channel at the same time, while reproducing a specific channel using an apparatus capable of recording, and reproducing operations when the information of the respective channels are minutely arranged in the primary dimension. This is because stricter accuracy is required to distinguish among the recording regions of the respective channels, and the laser power has to be often switched often with the recording operation and the reproducing operation, and so on.

SUMMARY OF THE INVENTION

Accordingly, the present invention has been developed with a view to substantially eliminating the above discussed drawbacks inherent in the prior art, and has for its essential object to provide an improved disk apparatus for separating, and recording the compressed data of a plurality of channels in a track direction for each channel on a disk recording medium.

Another important object of the present invention is to provide an improved disk apparatus which loads the compressed data of a plurality of channels which have been separated, and recorded on the disk recording medium, restores the data, and reproduces them simultaneously and continuously.

In accomplishing these and other objects, according to one preferred embodiment of the present invention, there is provided a disk apparatus which includes a disk recording medium having regions (n is a natural number) in a track direction, a data compressor for compressing the data of m (m is a natural number, $m \leq n$) channels to $1/m$ or lower in terms of time, a recording data delaying apparatus for causing delay in the data of the m channels so that the compressed data of the m channels compressed by the above described data compressor may be arranged into time division, a data compounding apparatus for compounding the compressed data of the delayed m channels into one data, stream a data recording apparatus for recording on the above described disk recording medium the compounded data obtained by the above described data compounding apparatus.

The disk apparatus of the present invention comprises a data reproducing apparatus for reproducing the compressed data of the m channels which have been separated and, recorded on the above described disk recording medium, a data separating apparatus for separating into the m channels the compressed data reproduced by the above described data reproducing apparatus, a data expander for expanding the compressed data of the m channels obtained from the above described data separating apparatus, a reproducing data delaying apparatus for adjusting the timing of the expansion data of the m channels obtained from the above described data expander.

The disk apparatus of the present invention comprises a disk recording medium divided into n regions (n is a natural) number in a track direction by the data recording and reproducing apparatus and a data recording, reproducing apparatus for separating and recording on the above described disk recording medium the data of the m (natural number, $M \leq n$) channels compressed to $1/n$ or lower in terms of time or reproducing the compressed data of the recorded m channels, a data separating apparatus for separating into m channels the data reproduced by the above described data recording and reproducing apparatus, a data expander for expanding the compressed data of m channels obtained from the above described data separating apparatus, a reproducing data delaying apparatus for adjusting the timing of the expanded data of the m channels obtained from the above described data expander, an editing apparatus for compounding or editing the data of the m channels obtained from the above described reproducing data delaying apparatus so as to edit them into the data of p (p is a natural number, $P \leq n-m$) channels, a data compressor for compressing the data of the edited p channels to $1/n$ or lower in terms of time, a recording data delaying apparatus for delaying the compressed data of the p channels so that the data compressed by the above described data compressor may be arranged in time division, a data compounding apparatus for compounding the compressed data of the p channels into one data stream, wherein the compounded data obtained by the above described data compounding apparatus are arranged to be recorded on the above described disk recording embodiment by the above described data recording, and reproducing apparatus.

In accordance with the construction of the present invention, the data of a plurality of channels can be respectively compressed in terms of time, the data of the respective channels can be separated and recorded in the track direction on the disk reproducing medium, the compressed data on the disk recording medium which has been separated and reproduced in the track direction are reproduced for the respective channels, the data of the respective channels can be reproduced at the same time by the expanding operation of the contracted data so as to effect the delaying operation. In addition to the high speed retrieving performance of the disk recording medium, the data of the plurality of channels can be recorded or reproduced independently as in the magnetic tape. The filing edition of image information or voice information or the like can be effected with high efficiency by the addition of the editing apparatus.

BRIEF DESCRIPTION OF THE DRAWINGS

These and other objects and features of the present invention will become apparent from the following description of the preferred embodiments thereof with reference to the accompanying drawings, in which:

FIG. 1 is a block diagram of a disk recording and reproducing system of the present invention;

FIG. 2 is a block diagram of a disk reproducing apparatus in accordance with a first embodiment of the present invention;

FIG. 14 is a flowchart of data processing on the employment of the medium of FIG. 8.

DETAILED DESCRIPTION OF THE INVENTION

Figure 3:
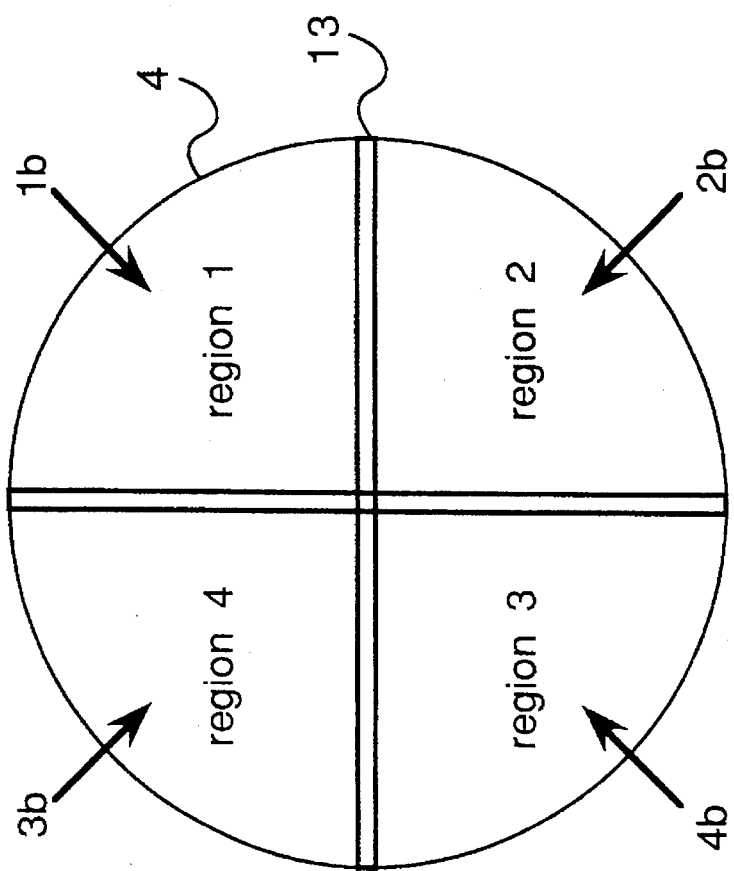
FIG. 3 is a plan view of a disk recording medium.

Before the description of the present invention proceeds, it is to be noted that like parts are designated by like reference numerals throughout the accompanying drawings.

A disk recording and reproducing apparatus of the present invention will be fully described hereinafter with reference to the drawings.

A first embodiment of the disk apparatus will be described using of FIG. 1, FIG. 2 and FIG. 3. A disk recording and reproducing system shown in FIG. 1 is composed of a data recording and reproducing apparatus 1, an optical pickup 2, a rotary motor 3, and a disk recording medium 4. The data recording and reproducing apparatus 1 may have either of the recording and reproducing functions as in a data recording apparatus 8 or a data reproducing apparatus. FIG. 2 shows a disk apparatus provided with a recording function comprising a data compressor 5, a recording data delay apparatus 6, a data compounding apparatus 7, a data recording apparatus 8, a disk recording medium 4. FIG. 3 shows a disk recording medium 4 divided into four regions in a track direction, with laser power switching regions 13 for switching the laser power being provided among the respective regions. The disk recording medium 4 has marks, for distinguishing the respective regions, pre-formatted on the laser power switching regions 13. The respective regions are adapted to be recognized during the disk recording and reproducing time.

Figure 4:
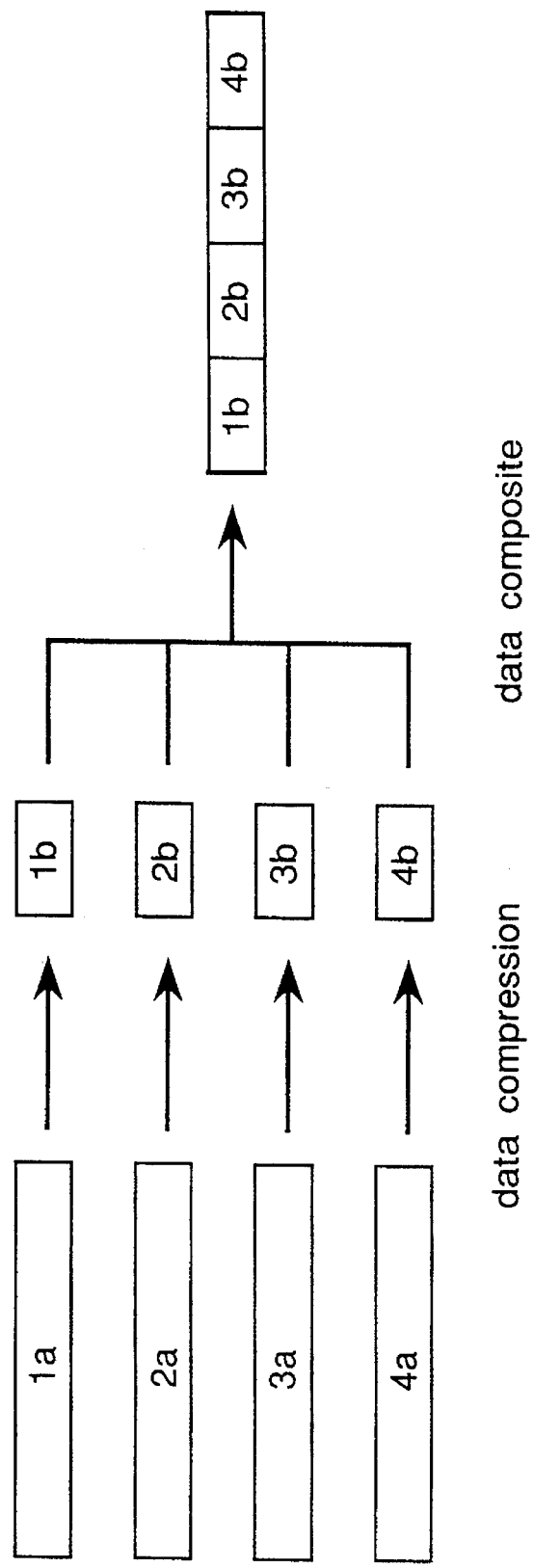
FIG. 4 is a diagram showing the processes of data compression and data compounding.

FIG. 4 shows processes for compressing and compounding the data. A case will be described where the data of the respective channels are respectively assigned to four regions on the disk recording medium 4 and are recorded on it with the number of the channels of data to be recorded being four.

The recording data of four channels are compressed into ¼ or lower (division number or lower of the disk) in terms of time. Data of the compressed four channels are respectively provided with a proper delay time by a recording data delay apparatus 6, and are rearranged and compounded in a time series by a data compounding apparatus, and are provided with information such as address and so on, and become the data of one track peripheral portion.

A process where the data of four channels are compressed, and the data are compounded will be described in detail using FIG. 4. Reference characters 1a, 2a, 3a, and 4a are the original data, and are compressed in terms of time into 1b, 2b, 3b, and 4b through the data compounding apparatus 7. The compounded data obtained here become one track portion of data. The data length is equal to the original data length of each channels. The data obtained here are recorded by the data recording apparatus 8 with four channels being distributed into regions separated on the disk recording medium 4 as shown in FIG. 3. The laser power switching regions 13 provided among the regions are effective in a disk apparatus having both functions of the recording and reproducing operations.

Figure 5:
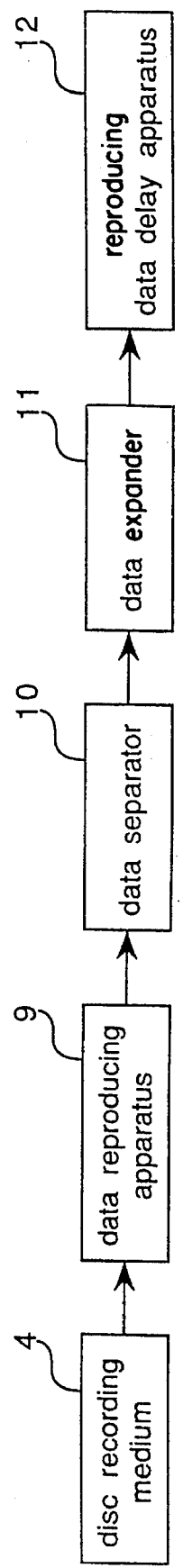
FIG. 5 is a block diagram of a disk reproducing apparatus in accordance with a second embodiment of the present invention.
Figure 6:
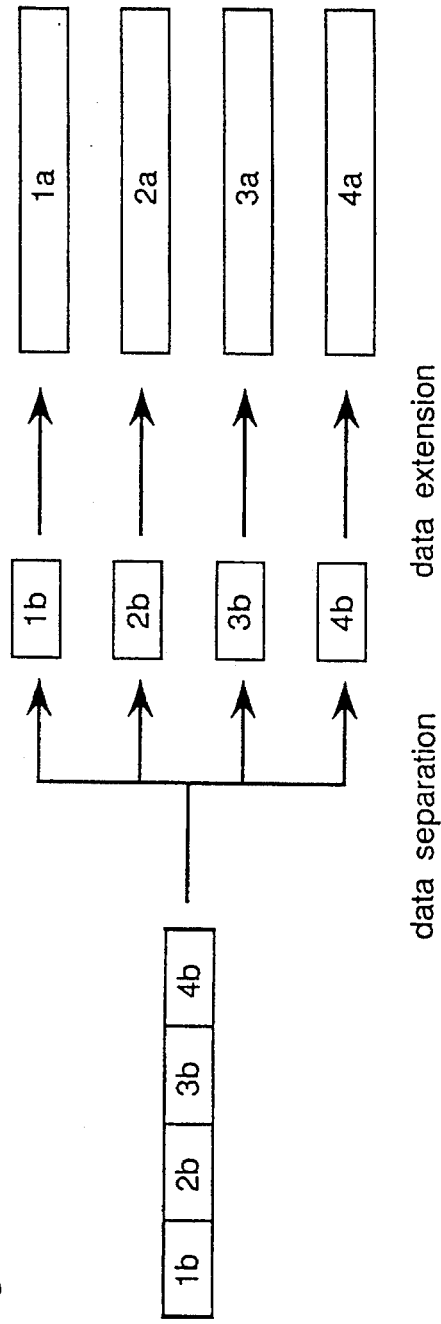
FIG. 6 is a diagram showing the processes of data separation and data expansion.

A second embodiment of the disk apparatus is described hereinafter with reference to FIG. 5, and FIG. 6. FIG. 5 shows a disk apparatus, provided with a reproducing function, a disk recording medium 4, a data reproducing apparatus 9, a data separating apparatus 10, a data expander 11, and a reproducing data delaying apparatus 12. FIG. 6 shows a separating and expanding process of the compounded and contracted data. A case will be described wherein four channels of compressed data on the disk recording medium 4 recorded in the first embodiment are reproduced.

The data recorded on the disk recording medium 4 are reproduced in the compressed data of four channels by a data reproducing apparatus 9, and are separated for each channels by a data separating apparatus 10, and are stretched to their original length by a data expander 11, and are provided with a proper delay time so that the timing of the four channels may be conformed to by a reproducing data delay apparatus 12.

A process where the data separation is effected and the data expansion is effected will be described in detail using FIG. 6. One track portion of compressed data 1b, 2b, 3b, and 4b reproduced from the disk recording medium 4 are separated into the compressed data for each channels by the data separating apparatus 10, and are expanded respectively and are restored to the original data 1a, 2a, 3a, and 4a.

Figure 7:
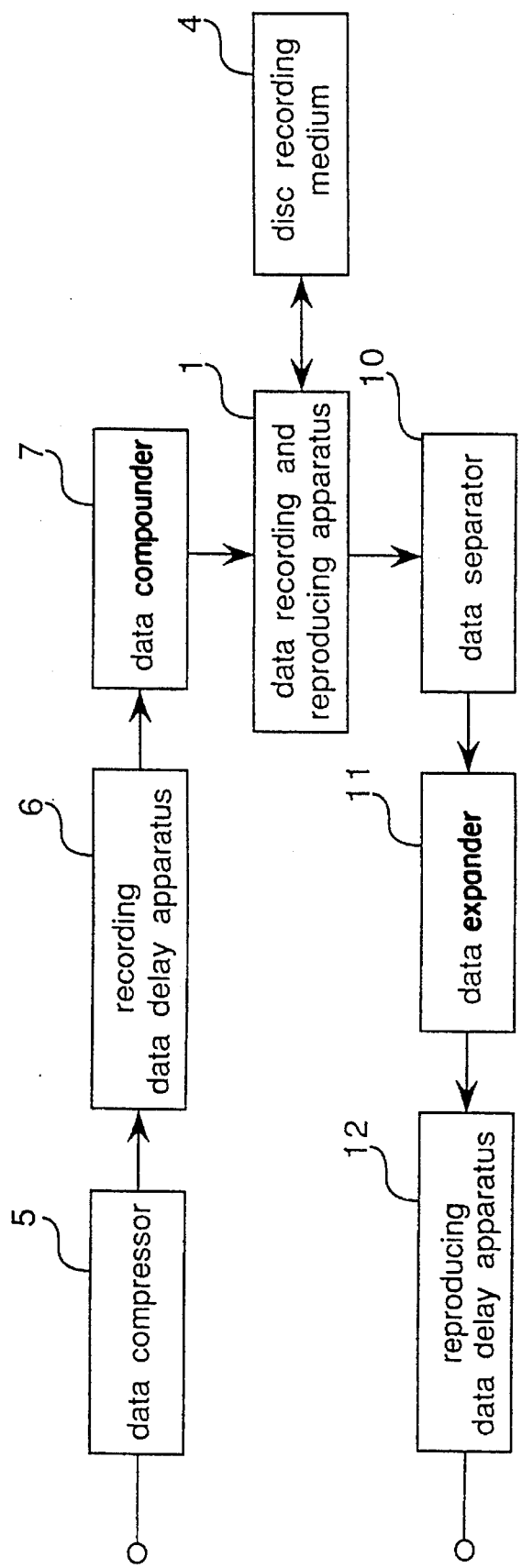
FIG. 7 is a block diagram of the disk recording and reproducing apparatus in accordance with a third embodiment of the present invention.

A third embodiment of the disk apparatus will be described hereinafter with reference to FIG. 7. FIG. 7 shows a disk apparatus, and provided with a recording and reproducing function, comprising a data compressor 5, a recording data delay apparatus 6, a data compounding apparatus 7, a data recording and reproducing apparatus 1, a disk recording medium 4, a data separating apparatus 10, a data expander 11, and a reproducing data delay apparatus 12. A recording method of disk recording medium 4 comprises the steps of magnetically storing as in a magnetic disk, and storing with both light and magnetism as in a photomagnetic disk, storing with only light as in a phase change type optical disk, and so on. A case will be described especially where recording and reproducing operations are effected with an optical disk of the phase change type. A case will be described wherein the number of the channels of the data to be handled is four, and the data of each channels are respectively assigned to four regions on the disk recording medium 4, and are recorded.

At the recording time, the recording data of four channels are compressed to ¼ or lower (division number or lower of the disk) in terms of time by the data compressor 5. The compressed data of four channels are respectively provided with a proper delay time by the recording data delay apparatus 6, and and are arranged, and and compounded in the time division by a data compounding apparatus 7, and are provided with channel information, address information and so on into the data of one track portion. The data are recorded by a data recording and reproducing apparatus 1 with each of four channels being distributed into a region determined on the disk recording medium 5 as shown in FIG. 4.

At the reproducing time, data recorded on the disk recording medium 4 by the data recording and reproducing apparatus 1 are reproduced and the reproduced data are separated for each channels by the data separating apparatus 10, and are restored to the original length by the data expander 11, and are provided with a proper delay time so that the timing of the four channels may be conformed to by the reproducing data delay apparatus 12.

Since laser power at a storing time and laser power at a reproducing time are different from each other in the optical disk of the phase change type, a switching operation of the laser power is effected with the recording and the reproducing. It is necessary to switch the laser power between the region 1 and the region 2 when a recording operation is effected in the region 2 while effecting a reproducing operation in, for example, the region 1, when the recording or the reproducing operation is effected separately for each division region. The laser power can be changed by a change in the driving current of the laser. The laser power switching regions 13 are provided among the division regions on the optical disk and because the recording and reproducing operations of the data cannot be effected because of unstable condition in the power switching portion.

Figure 8:
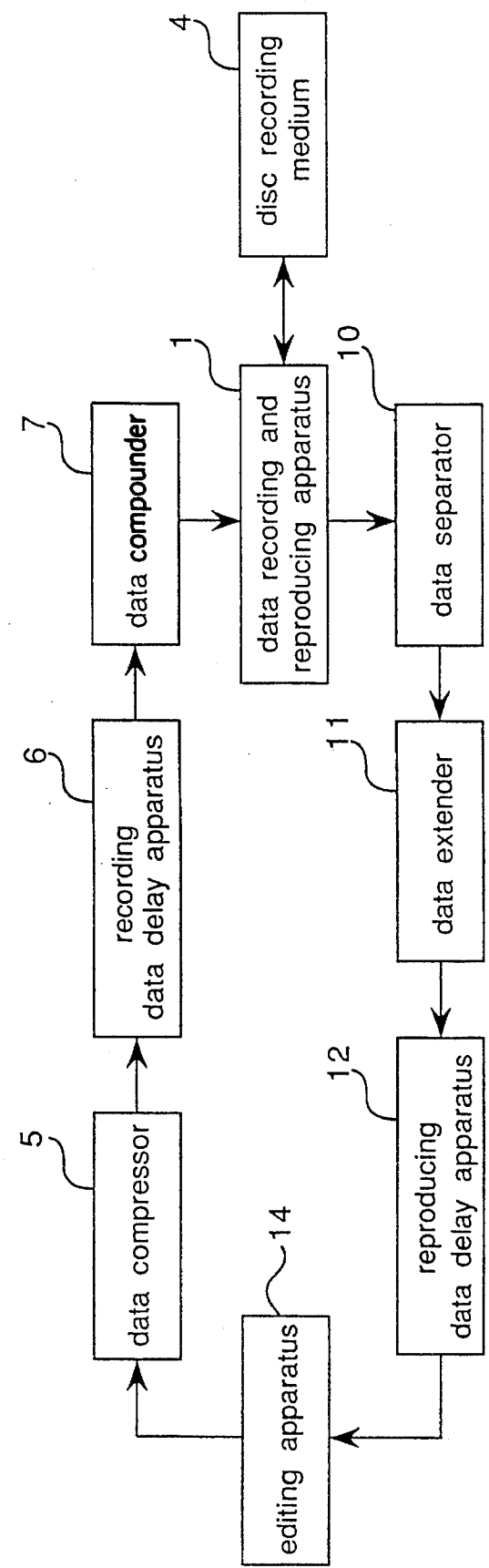
FIG. 8 is a block diagram of a disk recording and reproducing apparatus in accordance with a fourth embodiment of the present invention.
Figure 9:
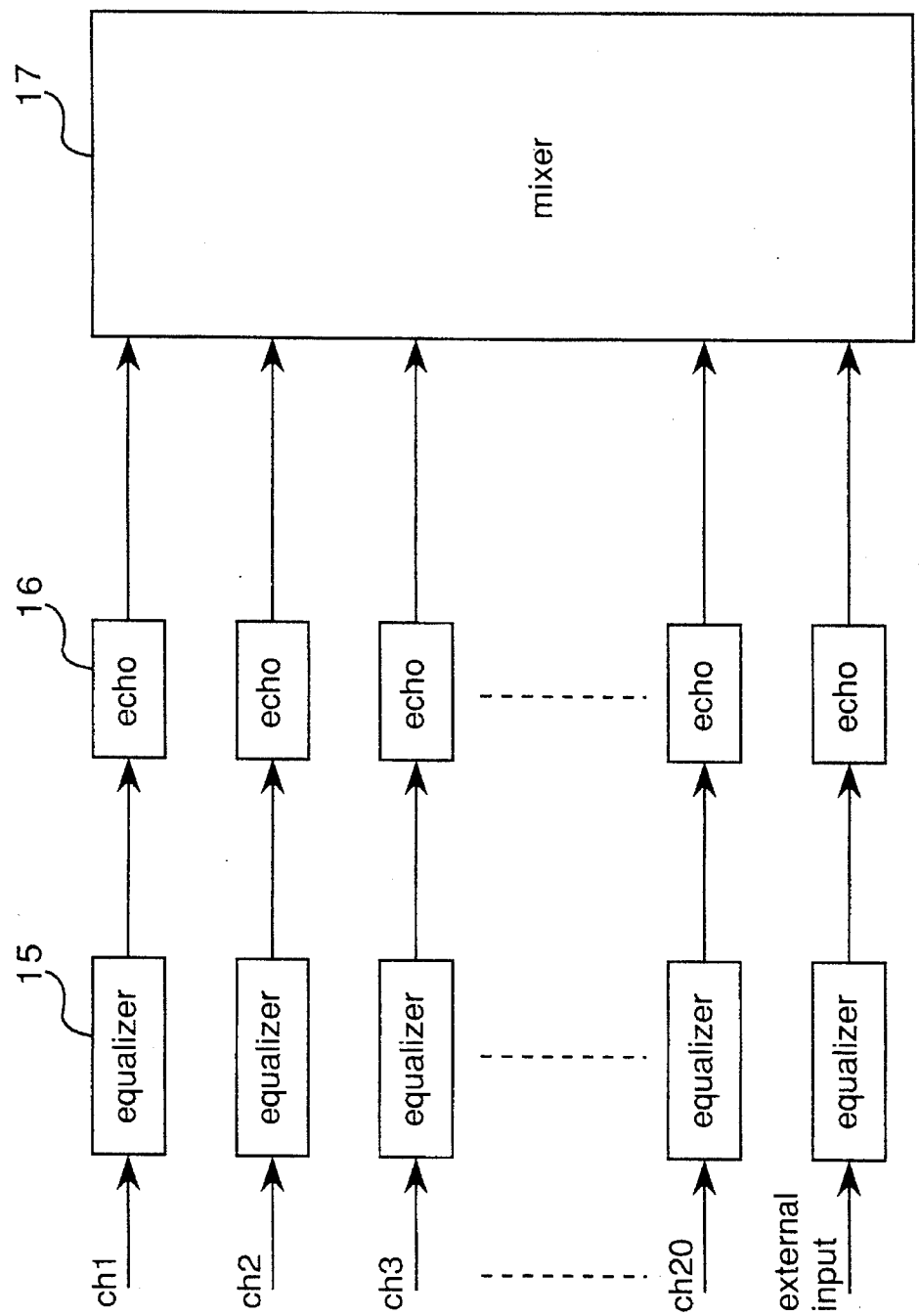
FIG. 9 is a subblock diagram of an editing apparatus of FIG. 8.
Figure 10:
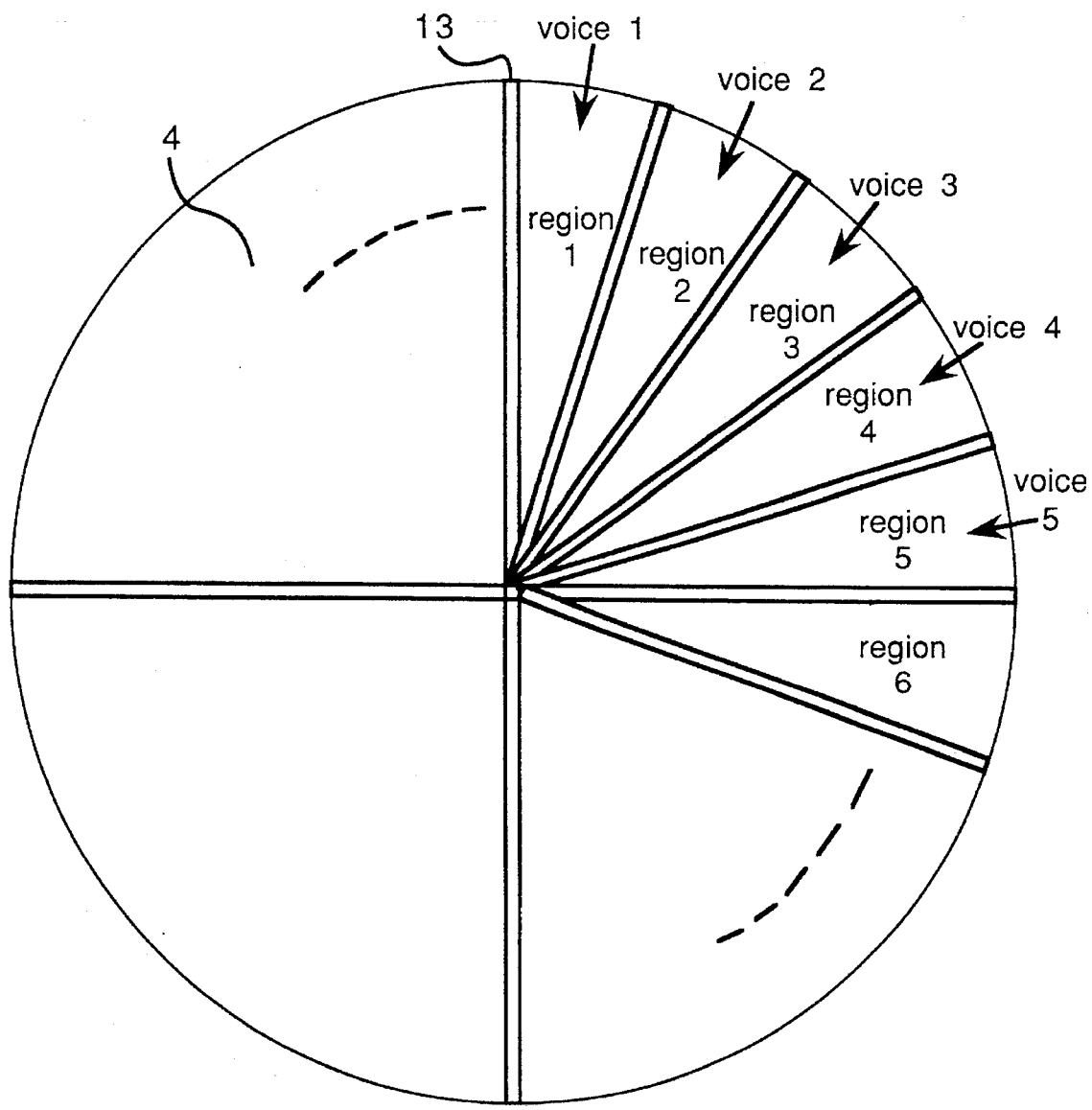
FIG. 10 is a plan view of a disk recording medium.

A fourth embodiment of a disk apparatus will be described hereinafter with reference to FIG. 8 and FIG. 9, FIG. 10 and FIG. 14. FIG. 8 shows a disk apparatus, provided with a data editing function, comprising a data compressor 5, a recording data delay apparatus 6, a data compounding apparatus 7, a data recording and reproducing apparatus 1, a disk recording medium 4, a data separating apparatus 10, a data expander 11, a reproducing data delay apparatus 12, and an editing apparatus 14. FIG. 9 shows one example of an editing apparatus 14. FIG. 10 shows a top face view of a disk recording medium 4 which is divided into twenty regions in a track direction. Laser power switching regions 13 for switching the laser power are provided among the respectively regions. The disk recording medium 4 has marks, for distinguishing the respective regions, preformated in the laser power switching region 13 so that the respective regions may be recognized during the disk recording and reproducing time. The disk recording medium is a phase change type of optical disk capable of recording and reproducing operations. FIG. 14 is a flowchart of data processing comprising nine steps from data reproducing to data recording on the employment of medium 4 of FIG. 8. A method of effecting recording and reproducing operations is similar to the one described for the third embodiment. A maximum of twenty channels of data can be recorded on this disk. A case is described hereinafter where five channels of voice data, such as voice 1, voice 2, voice 3, voice 4, voice 5 are handled.

The voice data of five channels are compressed to ¹⁄₂₀ or lower (division number or lower of the disk) in terms of time for each channels by a data compressor 5. The compressed data are provided with a proper delay time by a recording data delay apparatus 6 for each channels, and are provided with channels information, address information and so on, and are arranged in time division and compounded by a data compounding apparatus 7 into one track portion of data. The data are recorded on regions assigned to five voice channels on a disk recording medium as shown in FIG. 10 by the data recording and reproducing apparatus 1. Data does not exist in the remaining 15 regions, because only the regions 1 through 5 are used.

During the reproducing time, the data recorded on the disk recording medium 4 are reproduced by the data recording and reproducing apparatus 1, are separated for each channels by the data separating apparatus 10, and are restored to the original length by the data expander 11, and are provided with a proper delay time so that the timing of twenty channels may be conformed to by the reproducing data delay apparatus 12 and are reproduced at the same time in twenty channels. Equalizers are added, and echoes are applied to reproducing signals obtained here using the editing apparatus 14 as shown in FIG. 9. A mixing operation and so on are effected among the voice information of multichannels recorded on the optical disk or with the voice information obtained from the other acoustic appliance. Data edited by the editing apparatus 14 are again compressed, and are recorded on non-recorded region on the disk recording medium 4.

Figure 11:
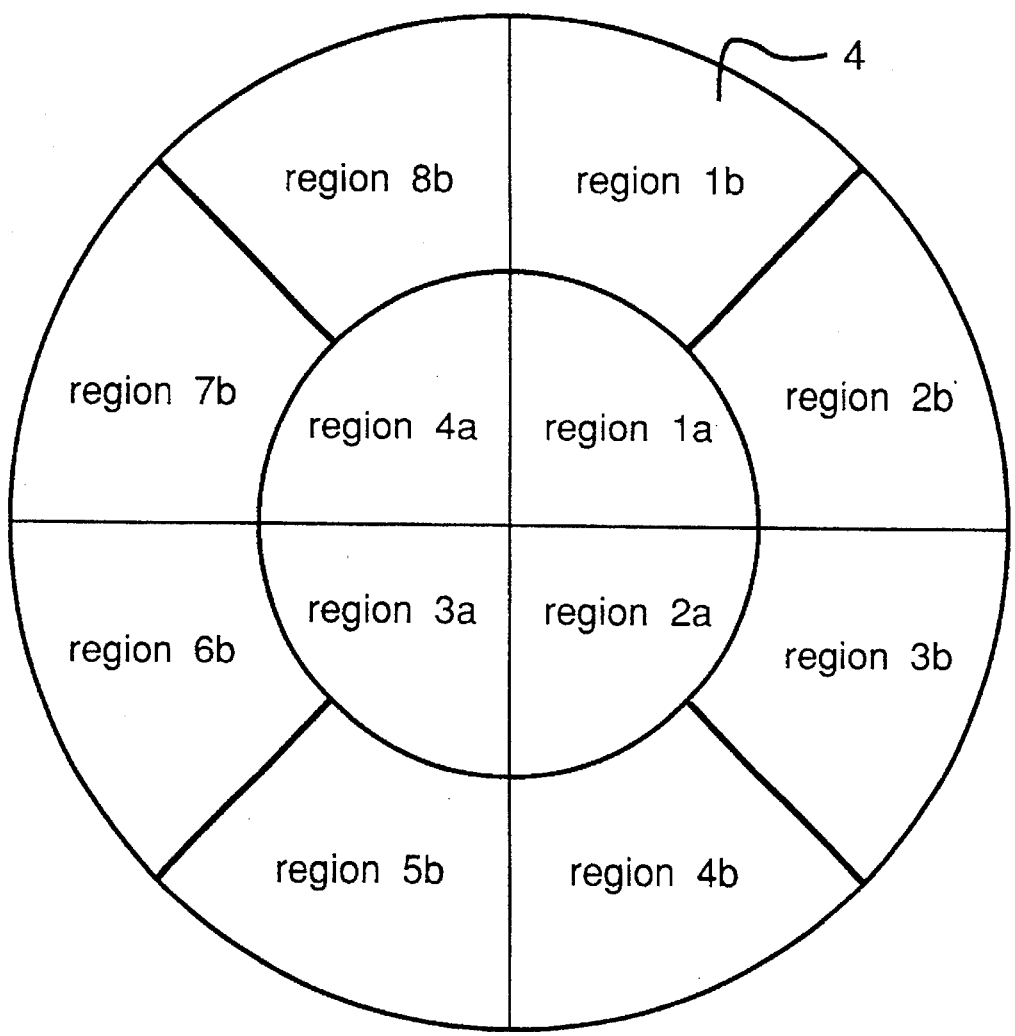
FIG. 11 is a plan view of a disk recording medium where the division number in a track direction is four on the internal peripheral side, and is eight on the external peripheral side.
Figure 12:
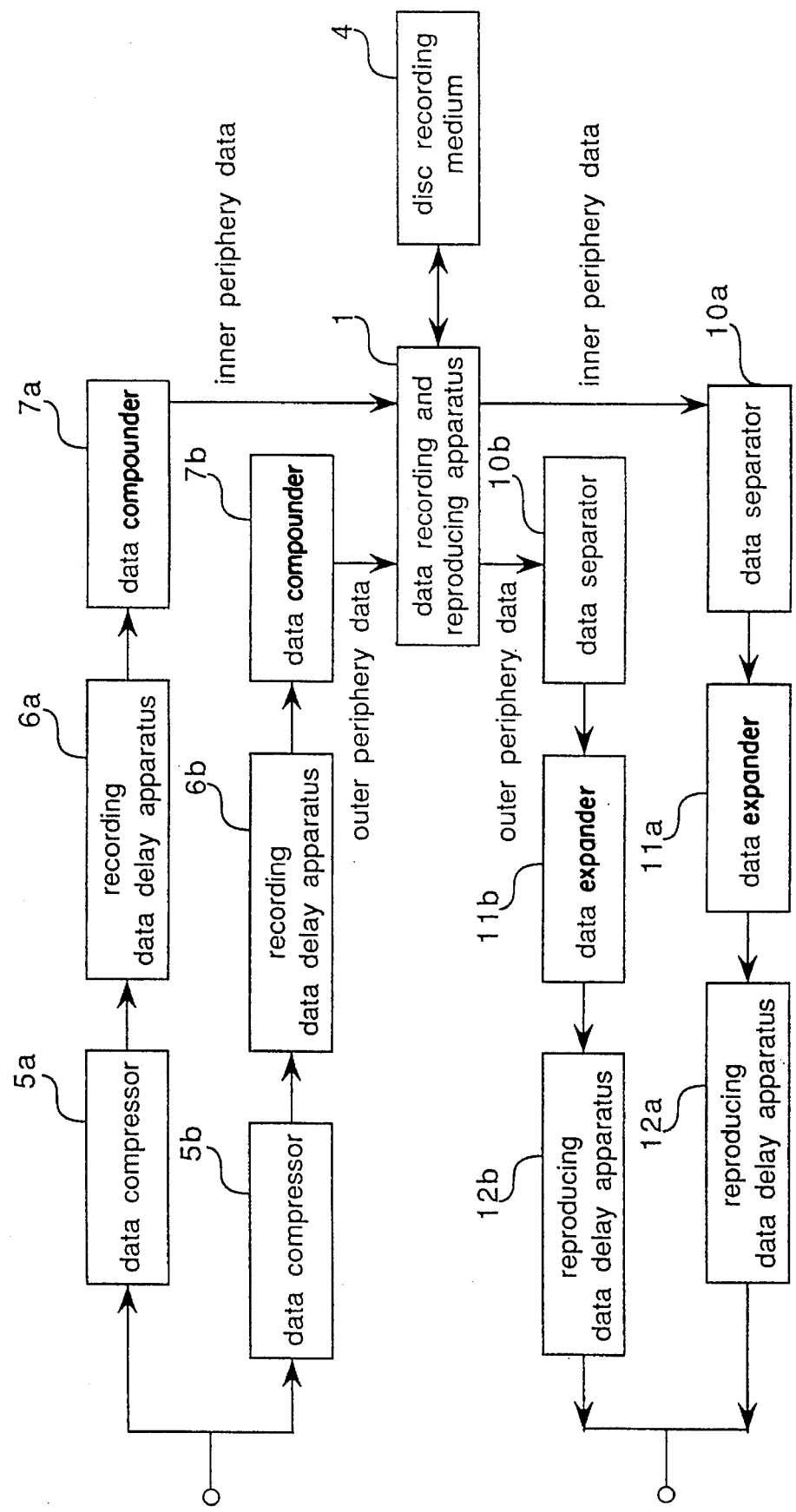
FIG. 12 is a block diagram of a disk recording and reproducing apparatus in accordance with a fifth embodiment of the present invention.

A fifth embodiment of the disk apparatus will be described hereinafter using FIG. 11 and FIG. 12. FIG. 11 shows a disk recording medium 4 changed into two types so that the division number in the track direction is four on the internal peripheral side and eight on the external peripheral side. A maximum of four channels of data can be recorded on its internal peripheral side, and a maximum eight channels a maximum of can be recorded on its external peripheral side. FIG. 12 shows a disk apparatus, provided with a recording and reproducing function, comprising data compressors 5a, and 5b, recording data delay apparatuses 6a, and 6b, data compounding apparatuses 7a, and 7b, a data recording and reproducing apparatus 1, a disk recording medium 4, data separating apparatuses 10a, and 10b, data expanders 11a, and 11b, reproducing data delay apparatuses 12a, and 12b. A case will be described hereinafter wherein the data of the respective channels are respectively assigned to the dividing regions on the disk recording medium 4, and are recorded on them with four channels of data being handled.

During the recording time on the internal peripheral side, the recording data of four channels are compressed to ¼ or lower (division number or lower of the disk) in terms of time by a data compressor 5a. The data of the compressed four channels are respectively provided with a proper delay time by a recording data delay apparatus 6a, and are arranged, and compounded in time division by the data compounding apparatus 7b, and are provided with channels information, and address information and so on into one track portion of data. The data are respectively recorded by the data recording and reproducing apparatus 1 on regions where each of four channels is determined on the disk reproducing medium 4.

During the recording time on the external peripheral side, the recording data of four channels are compressed to ⅛ or lower (division number or lower of the disk) in terms of time by a data compressor 5b. The data of the compressed four channels are respectively provided with a proper delay time by a recording data delay apparatus 6b, and are arranged, and compounded in time division by the data compounding apparatus 7b, and are provided with channels information, address information and so on into one track portion of data. The data are respectively recorded by the data recording and reproducing apparatus 1 on regions where each of four channels is determined on the disk reproducing medium 4. Since a maximum of eight channels of data can be recorded on the external peripheral side, no data exists in the remaining four channels or dummy data are stored.

During the reproducing time on the internal peripheral side, the data recorded on the disk recording medium 4 are reproduced by the data recording and reproducing apparatus 1, and are separated for each channels in the reproduced data by the data separating apparatus 10a, and are restored into the original length by a data expander 11a, and are provided with a proper delay time so that the timing of four channels may be conformed to by a reproducing data delay apparatus 12a.

During the reproducing time on the external peripheral side, data recorded on the disk recording medium 4 are reproduced by the data recording and reproducing apparatus 1, and are separated for each channels in the reproduced data by a data separating apparatus 10b, and are restored to the original length by a data expander 11b, and are provided with a proper data delay time by a reproducing data delay apparatus 12b so that the timing of four channels may be conformed to by a reproducing data delay apparatus 12b. The switching operation of the internal and external peripheries are adapted to be controlled by the data recording and reproducing apparatus 1.

The number of the data given in channels of first embodiment through a fifth embodiment is but one example. Other number of channels may be provided if the range is in a range capable of compression and recording. The division number of the recording medium disk is not necessary to conform, without fail, to the channels number to be recorded. A plurality of regions may be used with one channels.

Although a phase change type of optical disk is provided as one example in a fourth embodiment, other types of information recording disks may be provided.

Figure 13:
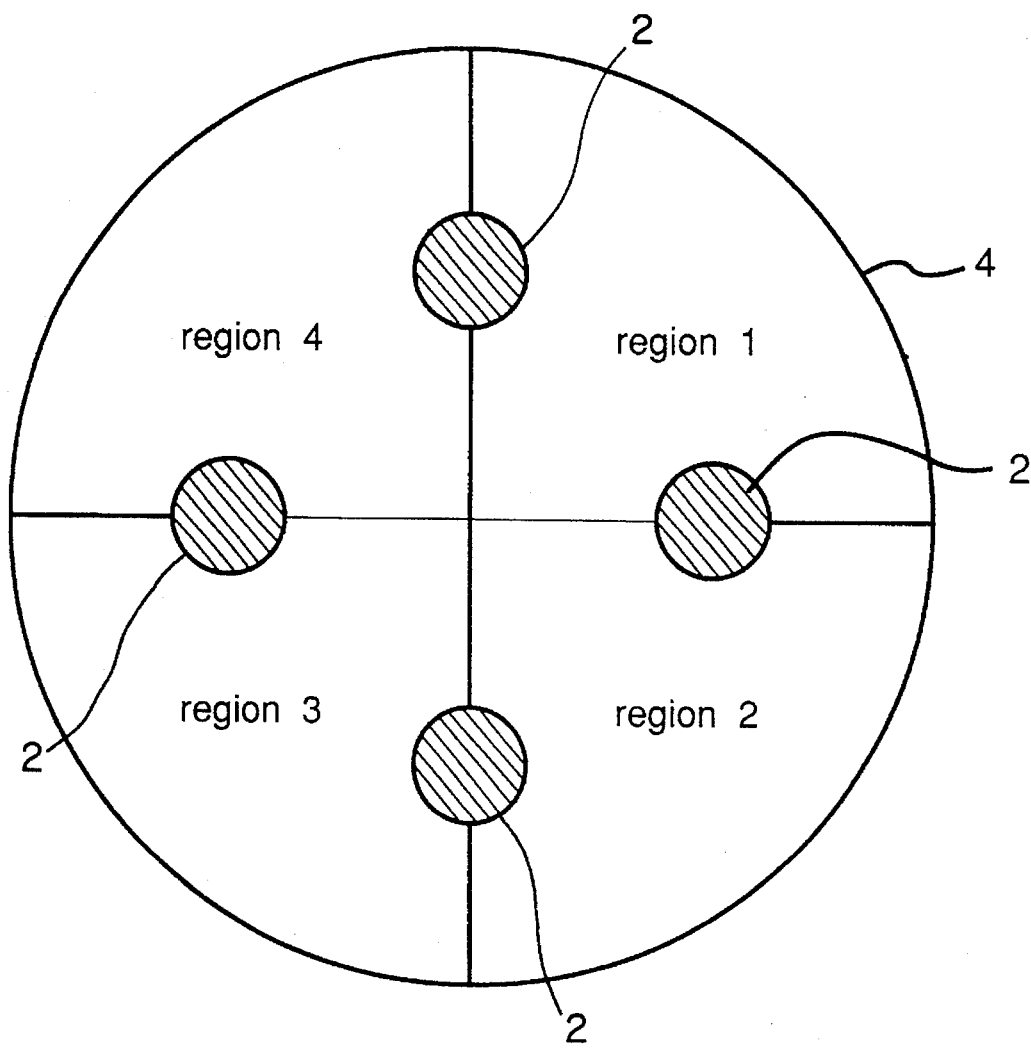
FIG. 13 is a schematic diagram of a disk reproducing and reproducing apparatus having a plurality of pickups.

Although an editing operation can be effected in the same track in the fourth embodiment, an editing operation can be effected using the information of a different track. The problem can be solved by provision of a plurality of optical pickups 2 for reading the data from the disk recording medium 5 as shown in FIG. 13, by provision of another disk apparatus as shown in the third embodiment or by the external provision of a means for temporarily accumulating information.

A recording data delay apparatus 6 (6a, 6b) and a reproducing data delay apparatus 12 (12a, 12b) may be used in common in the third embodiment through the fifth embodiment.

Although a proper delay time is provided for each channels by the recording data delay apparatus 6 after the compression of the recording data by the data compressor 5 in the first embodiment, the third embodiment, the fourth embodiment, and the fifth embodiment, the order may be reversed.

Although a proper delay time is provided for each channels by the reproducing data delay apparatus 12 after the compressed data have been expanded by the data expander 11 in the second embodiment through the fifth embodiment, the order may be reversed.

Although the recording data delay apparatus 6, and the reproducing data delay apparatus 12 are used in the first embodiment through the fifth embodiment, the delay apparatuses are not necessary. The data may be accumulated temporarily by a buffer memory or the like or the accumulated data may be output after a given time so that a delaying operation is caused as a result.

The data to be recorded on the disk recording medium may be data such as image information, voice information or the like in the first embodiment through the third embodiment and the fifth embodiment.

Although the disk apparatus in the fifth embodiment respectively has two data compressors and two data expanders for internal peripheral side use and for external peripheral side use, they may be used in common if the compression coefficient in both the internal periphery and external periphery is made the same.

Although the disk recording medium 4 is divided into two parts, the internal periphery and the external periphery, in the radial direction in the fifth embodiment, it may be divided more than two parts.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A disk apparatus comprising: a disk recording medium having n spatially separated regions (n is a natural number) in a track direction; a data compressor for compressing data of m (m is a natural number, m≦n) channels to 1/m or lower in terms of time; a recording data delay apparatus for causing delay in the data of the m channels so that the compression data compressed by the data compressor is arranged into time division; a data compounding apparatus for compounding the compressed data of the m channels delayed by the recording data delay apparatus into one data stream; a data recording apparatus for recording on the disk recording medium the compounded data obtained by the data compounding apparatus, wherein the data of a maximum of n channels are respectively compressed in terms of time so as to respectively record them on n regions of the disk recording medium.

2. A disk apparatus comprising: a disk recording medium having n spatially separated regions (n is a natural number) in a track direction; a data reproducing apparatus for reproducing compressed data of m channels which have been separated and recorded (m is a natural number, $m \leq n$) on n regions of the disk in a track direction; a data separating apparatus for separating into m channels the compressed data reproduced by the data reproducing apparatus; a data expander for expanding the compressed data of m channels obtained from the data separating apparatus; a reproducing data delay apparatus for adjusting the timing of the expansion data of m channels obtained from the data expander, wherein the data of m channels are reproduced simultaneously and continuously.

3. A disk apparatus comprising:

a disk recording medium having regions divided into n spatially separated sections (n is a natural number) in the direction of a track;

a data recording and reproducing apparatus for recording data of m channels (m is a natural number, $m \leq n$) compressed to less than 1/n in term of time upon the spatially separated regions of the disk recording medium, or reproducing the compressed data of the recorded m channels, a data reproducing block including a data separating apparatus for separating the data reproduced by the recording and reproducing apparatus into m channels; a data expander for expanding the compressed data of m channels obtained from the data separating apparatus; and a reproducing data delay apparatus for adjusting the timing of the expanded data of m channels obtained by the data expander; and a data recording block including a data compressor for compressing the data of p channels (p is a natural number, $p \leq n$) to less than 1/p in terms of time, a recording data delay apparatus for delay the compressed data of p channels so that the data compressed by the data compressor are arranged in time division; a data compounding apparatus for compounding the compressed data of p channels into a data stream, whereby the data reproducing block reproduces the compressed data of m channels recorded on the disk to compound or operate upon the data recorded on the disk into data of p channels by an external editing apparatus, and whereby the disk recording block compresses respectively the edited data of p channels to less than 1/n in terms of time and records the compressed data of p channels on the disk again.

4. The disk apparatus as defined in claim 3, where a reproducing data delay apparatus for adjusting the timing of the data of a plurality of channels obtained from a data expander is used in common with a recording data delaying apparatus for arranging the compressed data in time division.

5. The disk apparatus defined in claim 3, where a mechanism for recording and reproducing the data on a disk recording medium is provided by plurality.

6. The disk apparatus as defined in claim 1, where data to be recorded on the disk recording medium are voice information.

7. The disk apparatus as defined in claim 2, where data to be recorded on the disk recording medium are voice information.

8. The disk apparatus as defined in claim 3, where data to be recorded on the disk recording medium are voice information.

9. A disk apparatus as defined in claim 1, where the division number in a track direction on the disk recording medium is different between the internal peripheral side and the external peripheral side.

* * * * *